(12) United States Patent
Fok et al.

(10) Patent No.: US 7,873,321 B2
(45) Date of Patent: Jan. 18, 2011

(54) APPARATUS AND METHODS FOR DETERMINING NETWORK ACCESS PERFORMANCE OF A WIRELESS DEVICE

(75) Inventors: Kenny Fok, San Diego, CA (US); Tia Manning Cassett, San Diego, CA (US); Jihyun Hwang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 720 days.

(21) Appl. No.: 11/251,376

(22) Filed: Oct. 14, 2005

(65) Prior Publication Data
US 2006/0224730 A1    Oct. 5, 2006

Related U.S. Application Data

(60) Provisional application No. 60/666,415, filed on Mar. 29, 2005.

(51) Int. Cl.
H04B 17/00 (2006.01)
(52) U.S. Cl. .............. 455/67.11; 455/67.14; 455/115.1; 709/224
(58) Field of Classification Search .............. 455/550.1, 455/414.1, 556.1, 418, 411, 435.2, 67.11, 455/67.13, 115.1–4; 370/328; 709/224
See application file for complete search history.

(56) References Cited

U.S. PATENT DOCUMENTS

| 6,298,233 | B1 | 10/2001 | Souissi et al. | |
|---|---|---|---|---|
| 6,456,652 | B1 * | 9/2002 | Kim et al. | ................... 375/224 |
| 6,459,695 | B1 | 10/2002 | Schmitt | |
| 6,856,802 | B1 * | 2/2005 | Kinnunen et al. | ............ 455/425 |
| 7,206,743 | B2 * | 4/2007 | Bonnifait et al. | ............. 704/270 |
| 7,319,847 | B2 * | 1/2008 | Xanthos et al. | .......... 455/67.11 |
| 2004/0203668 | A1 * | 10/2004 | Bowne et al. | ............. 455/414.1 |
| 2004/0203855 | A1 | 10/2004 | Veerasamy et al. | |
| 2005/0148335 | A1 * | 7/2005 | Benco et al. | ................. 455/445 |
| 2005/0282531 | A1 * | 12/2005 | Andreasson | ................. 455/418 |
| 2006/0014526 | A1 * | 1/2006 | Cherian | ................... 455/412.1 |
| 2006/0111040 | A1 * | 5/2006 | Jenkins et al. | ............. 455/12.1 |
| 2006/0203738 | A1 | 9/2006 | Fok et al. | |
| 2006/0223521 | A1 * | 10/2006 | Buyse | ......................... 455/423 |
| 2007/0190974 | A1 * | 8/2007 | Zhang | ........................ 455/411 |

FOREIGN PATENT DOCUMENTS

WO    WO 02/071780 A2    9/2002

* cited by examiner

*Primary Examiner*—CongVan Tran
(74) *Attorney, Agent, or Firm*—Abdollah Katbab; Nicholas A. Cole (57) ABSTRACT

Apparatus, methods, processors and computer readable media for determining the wireless network access performance or capability of a wireless device. Embodiments include a wireless device having a computer platform with a processing engine operable to generate a plurality of network access performance data during processing activities on the wireless device. The wireless device further includes a network access performance module operable to collect selected ones of the plurality of network access data associated with a predetermined data processing capability of the wireless device, and based on a predetermined collection configuration. The embodiments may also include an apparatus operable to generate the predetermined collection configuration, and operable to receive the collected network access data and to generate a performance report characterizing the network access performance or capability of the wireless device.

66 Claims, 6 Drawing Sheets

APPARATUS AND METHODS FOR DETERMINING NETWORK ACCESS PERFORMANCE OF A WIRELESS DEVICE

CLAIM OF PRIORITY UNDER 35 U.S.C. §119

The present application for patent claims priority to Provisional Application No. 60/666,415 entitled "Methods And Apparatus For Monitoring Network Access Performance For A Wireless Device," filed Mar. 29, 2005, assigned to the assignee hereof and hereby expressly incorporated by reference herein.

BACKGROUND

The described embodiments generally relate to wireless communications devices and computer networks. More particularly, the described embodiments relate to apparatus and methods for determining network access performance of a wireless device based on the analysis of network access-related information collected from the wireless device.

Wireless networking connects one or more wireless devices to a communications network and to other computer devices without a direct electrical connection, such as a copper wire or optical cable. Wireless devices communicate data across a wireless or partially wireless computer network by opening a "data" or "communication" channel on the network such that the device can send and receive data. The wireless devices often have wireless device resources, such as programs and hardware components, which individually and cooperatively operate to use and generate data in accordance to their design and specific protocol or configuration to transmit and receive data on the network. When a wireless device experiences a problem in accessing the wireless network for its designed operation, there is presently a lack of a good solution to measure and report the activities occurring on the device relating to the attempted access to the wireless network. Thus, a determination of problems encountered during network access attempts, and a determination of actual network access performance is difficult to obtain or must be recreated during with tests. For example, recreating an environment and the circumstances surrounding how a wireless device is performing in accessing the network is typically time consuming, as it requires the provisioning of resources to a specified geographical area of the network where access problems have been reported. Typically, such field testing is only performed upon initially setting up a particular type of wireless device, or after access problems have reached the attention of the provider of the wireless network, i.e. the network carrier. Additionally, such field testing can be very time consuming, and is not guaranteed to duplicate the network access environment that may have initially caused network access problems in a given device. Further, such field testing results in the dedication of numerous wireless devices, network testing resources, equipment and personnel to external testing and measurement of network access performance. Thus, once a wireless device is in operation, i.e., in use by the commercial/private owner, the actual network access performance data, such as number of access attempts, successful and unsuccessful, etc., is typically unknown to the network carrier with regard that specific device or networked area.

Another complicating factor in understanding and tracking the network access performance of a wireless device is interference from external testing and measurement equipment, and/or from other wireless devices. For example, in a wireless device such as a cellular phone, various analyzers are serially connected to the phone and input and/or measure various access-related parameters. Further, such measurements typically involve driving around a large number of cellular phones through a predetermined area to determine their access performance data in that area under varying environmental conditions. In such a test set up, the various external devices, and the presence of a number of other wireless devices in close proximity, change the radio frequency environment and make it difficult if not impossible to create an environment experienced by a wireless device in actual operation. Further, these field tests result in collecting access performance data in a testing mode, which as noted above, may be a different than is actually experienced during actual operation of a wireless device.

Accordingly, it would be advantageous to provide an apparatus and method that allows for efficient, comprehensive collection and reporting of wireless device network accessing performance.

BRIEF SUMMARY

The described embodiments comprise apparatus, methods, and programs for network access performance measurement, collection and reporting on a wireless device.

In one embodiment, for example, an apparatus for determining a network access performance of a wireless device comprises a network access performance module having a collection module operable to generate and transmit an access data collection configuration to a wireless device. The access data collection configuration comprises a predetermined network access-related parameter that defines at least one type of the network access data to retrieve from a computer platform of the wireless device. Further, a predetermined access characteristic of the wireless device is definable based on the defined type of network access data. Additionally, the apparatus includes a data repository operable to receive and store the access data collected from the computer platform of the wireless device.

In another embodiment, an apparatus for determining network access performance of a wireless device comprises a generator means for generating and transmitting an access data collection configuration across a wireless network to a wireless device. The access data collection configuration comprises a predetermined network access-related test and a predetermined network access-related parameter. The predetermined network access-related test is executable by a computer platform of the wireless device to generate network access data. The predetermined network access-related parameter defines a type of the network access data to retrieve from the computer platform of the wireless device. Further, the apparatus includes a storing means for receiving and storing the network access data collected from the computer platform of the wireless device. Additionally, the apparatus includes an analysis means for analyzing the collected network access data and generating a performance report having at least one access characteristic of the wireless device based on the collected network access data.

In yet another embodiment, a wireless device comprises a computer platform having a processing engine operable to generate a plurality of network access data associated with accessing a wireless network during processing activities on the wireless device. Additionally, the wireless device includes a network access performance module operable to collect at least a selected one of the plurality of network access data based on a predetermined network access collection configuration.

In a further embodiment, a wireless device comprises a processing means for generating a plurality of network access data during data processing activities on the wireless device. Additionally, the wireless device includes a means for collecting selected ones of the plurality of network access data associated with a predetermined data processing capability of the wireless device. The selected ones of the plurality of network access data are based on a network access collection configuration received from across a wireless network. Additionally, the wireless device includes a means for selectively transmitting the collected selected ones of the plurality of network access data across the wireless network based on the network access collection configuration.

In still another embodiment, a method of determining a network access performance of a wireless device comprises generating an access data collection configuration comprising a predetermined network access-related parameter. The predetermined network access-related parameter defines at least one of a plurality of network access data to retrieve from a computer platform of the wireless device, where a predetermined network access characteristic of the wireless device is definable based on the defined network access data. Further, the method includes receiving collected network access data based on the predetermined access data collection configuration. And, the method includes analyzing the collected network access data to determine the predetermined network access characteristic of the wireless device.

In further embodiment, a computer program is resident in a computer readable medium that, when executed, directs a computer device to perform the action of generating an access data collection configuration comprising a predetermined network access-related parameter selected from a plurality of network access-related parameters. The predetermined network access-related parameter defines at least one of a plurality of network access data to retrieve from a computer platform of the wireless device, where a predetermined network access characteristic of the wireless device is definable based on the defined network access data. Further, the program directs the computer device to perform the action of receiving collected network access data based on the predetermined access data collection configuration, and analyzing the collected network access data to determine the predetermined network access characteristic of the wireless device. Similarly, in another embodiment, at least one processor is configured to perform the above-stated actions.

In another embodiment, a method of determining a network access performance of a wireless device comprises receiving an access data collection configuration identifying at least one of a plurality of network access data to collect from a processing engine of the wireless device. The identified network access data are associated with a predetermined access characteristic of the wireless device. Further, the method includes collecting the identified network access data based on the received access data collection configuration, and selectively transmitting the collected network access data across the wireless network.

In yet another embodiment, a computer program is resident in a computer readable medium that, when executed, directs a wireless device to perform the action of receiving an access data collection configuration identifying at least one of a plurality of network access data to collect from a processing engine of the wireless device, where the identified network access data are associated with a predetermined access characteristic of the wireless device. Further, the program directs the wireless device to perform the actions of collecting the identified network access data based on the received access data collection configuration, and selectively transmitting the collected network access data across the wireless network. Similarly, in another embodiment, at least one processor is configured to perform the above-stated actions.

Additional aspects and advantages of the disclosed embodiments are set forth in part in the description, which follows, and in part are obvious from the description, or may be learned by practice of the disclosed embodiments. The aspects and advantages of the disclosed embodiments may also be realized and attained by the means of the instrumentalities and combinations particularly pointed out in the appended claims.

BRIEF DESCRIPTION OF THE DRAWINGS

The disclosed embodiments will hereinafter be described in conjunction with the appended drawings provided to illustrate and not to limit the disclosed embodiments, wherein like designations denote like elements, and in which.

DETAILED DESCRIPTION

The described embodiments relate to the monitoring, collection and analysis of access performance information relating to attempts of a wireless device to access a wireless network. For example, such information may relate to attempts to make a voice call, attempts to access a network data service such as the Internet, attempts to send a text message, and attempts to establish a video conference. The described embodiments provide systems, methods, processors and computer readable media which enable the collection of predetermined data that relate to predetermined access performance characteristics. Further, the described embodiments include the analysis of this data, and optionally the changing of wireless device settings based on this analysis to improve the access performance characteristic of interest.

Figure 1:
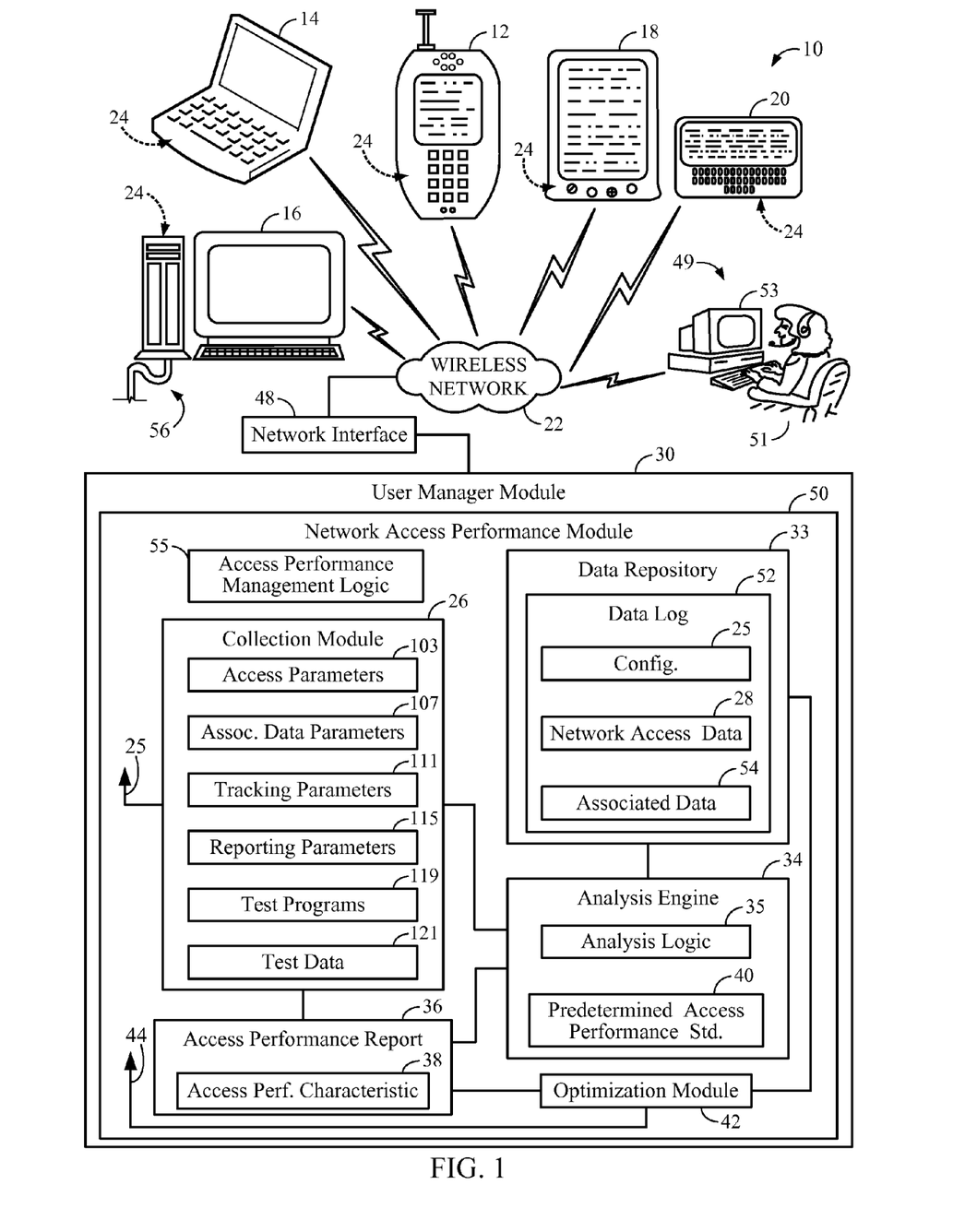
FIG. 1 is a representative diagram of one embodiment of a system for determining network access performance or capability of a wireless device.

Referring to FIG. 1, one embodiment of a system 10 for collecting network access performance-related data and analyzing the network access capabilities of any one of a plurality of wireless devices 12, 14, 16, 18, 20 in communication with a wireless network 22 includes a resident network access performance module 24 on each device. Each resident network access performance module 24 is operable, according to a collection configuration 25 defined by a remotely-located collection module 26, to collect and transmit selected ones of a plurality of types of network access data 28 across wireless network 22 to a user manager server 30. For example, collection module 26 dictates what types of network access data to collect and when to gather the data, along with when to upload the actual, collected network access data 28. Additionally, collection configuration 25 may also define which types of associated data 54 to collect and transmit, where associated data 54 could be either device-related or network-related information that provides state information or statistics relating to the access environment or scenario. As such, the respective wireless device may also collect and upload associated data 54, based on configuration 25, along with network access data 28. In one embodiment, user manager 30 receives the transmitted network access data 28 and associated data 54 in a data log 52, which is accessible by an analysis engine 34. Analysis engine 34 examines the collected network access data 28 and associated data 54, and generates a performance report 36. Performance report 36 characterizes at least one actual network access characteristic 38 associated with the respective device 12, 14, 16, 18, 20 based on data log 52. For example, the analysis performed by analysis engine 34 may compare select portions of network access data 28 with select portions of a predetermined access performance standard 40 to determine whether or not the network access data falls within the standard. Further, after performing an initial analysis on an initial set of network access data 28, analysis engine 34 may initiate further communications, such as through collection module 26, with one or more wireless devices 12, 14, 16, 18, 20 to retrieve additional network access data 28 and associated data 54 in order to provide further analysis and reporting. Analysis engine 34 may repeat such a feedback loop until a predetermined solution is achieved, i.e. until a set number of network access attempts are run and the results confirmed. Optionally, user manager 30 may include an optimization module 42 that analyzes data log 52 and/or each respective network access performance report 36, for example by applying an optimization algorithm, and generates new operational configuration settings 44 for a respective wireless device or for a network component to improve the network accessing capability of interest. User manager 30 may then transfer the updated device configuration settings 44 to the respective wireless device and/or network component in order to improve the network access performance capabilities associated with system 10. Thus, the present apparatus and methods provide for the collection, analysis and reporting of network access performance data 28 associated with the network accessing capabilities of a wireless device, and allow for troubleshooting and optimization of network access-related configurations in order to improve the network access performance and capabilities of the respective wireless device.

Network access data 28 can include any type of data related to a network accessing activity on a wireless device 12, 14, 16, 18, 20. For example, network access data 28 includes, but is not limited to: a network access related event, a protocol-related access message, an access channel message, a Radio Resource Control message, a non-access station ("NAS") message, a number of access probe sequences, an acknowledgement timeout from an access channel message, a randomization for access channel probe time, access channel message capsule information, a power level change for an access probe attempt, and a base station parameter. Additionally, network access data 28 includes network access related parameters including, but not limited to, call initiation information, call termination information and protocol related access information/messages. For example, call initiation information includes, but is not limited to, mobile origination/termination information, service negotiation information, network state information (e.g., dormant, disconnected), etc. For example, call termination information includes, but is not limited to, termination cause information, IP address information (e.g., requested/granted), etc. Further, network access data 28 may include other protocol related parameters (e.g. PDP in UMTS), mobile IP information, session initiation protocol information (e.g., registration-related information), etc. Additional examples of access data 28 include, but are not limited to, air interface data, handoff data, power control data, authentication data, service redirection data, roaming information, message driven indicators, application interface data, field test data, and other non-enumerated network access data, etc.

Further, for example, the types of network access data 28 which are measured involve the operational performance of various functions, parameters, characteristics, messaging protocols, etc., such as: terminations, originations and maintenance in strong signal, weak signal and mixed signal environments; radio frequency ("RF") performance data, such as: receive (Rx) data, including sensitivity, isolated magnetic dipole ("IMD") and self-jamming, transmit (Tx) data, such as waveform quality ("Rho"), power control and maximum power, and broadband ("BB") and digital signal processing ("DSP") data, such as signal acquisition, soft handoff ("SHO"), searcher, and finger assignment; interoperability data, such as: channel data, including access channel ("ACH"), dedicated paging channel ("DPCH"), forward traffic channel ("FTCH") and reverse traffic channel ("RTCH"), messaging data dealing with layer 1 and layer 2, and handoff parameters including SHO, interband hard handoff ("HHO") and interfrequency HHO. Further, for example, the measured data for the wireless device, such as system acquisition, high speed packet data ("HSPD"), location determination, call types (POTS, 3-way, call waiting, voice mail, authentication, etc.), provisioning (over-the-air service provisioning ("OTASP"), over-the-air parameter administration ("OTAPA"), IP over-the-air ("IOTA"), etc.), and other data dealing with features such as short message service ("SMS"), multimedia service ("MMS"), browser, Java software and BREW® or other application programming interface software.

Associated data 54 comprises wireless device information relevant to, or potentially having influence on, network access performance and/or network access data 28. For example, associated data 54 may identify and define a state of a device component or other device activity occurring during an attempt to access the network. Associated data 54 may include, but is not limited to: position/location information, time information, diagnostic information, a state of a device component during a network access attempt by the wireless device, a statistic or state associated with non-access-related processing occurring on the respective wireless device during a network access attempt, information relating to some other processing intensive activity (such as playing a game, a video or music, or taking a picture) occurring on the device during an access attempt, and other network or device information.

Referring back to FIG. 1, user manager 30 may communicate with wireless devices 12, 14, 16, 18, 20 through a direct, wired connection or through a wireless connection, such as through a network interface 48 in communication with wireless network 22. The communications between user manager 30 and wireless devices 12, 14, 16, 18, 20 may include downloads of all, or selected portions (such as maximum number of access probe sequences), of a remote network access performance module 50 that from and/or operate within resident access module 24. Other such communications include uploads from each wireless device 12, 14, 16, 18, 20 back to the user manager 30, such as uploads of network access data 28 or associated data 54.

User manager 30 may be at least one of any type of server, personal computer, mini-mainframe and the like. Further, there can be separate servers or computer devices associated with user manager 30 that work in concert to provide data in usable formats to parties, and/or a separate layer of control in the data flow between the wireless devices 12, 14, 16, 18, 20 and user manager 30. User manager 30 (or plurality of servers) can send software agents or applications, such as the resident access module 24, to wireless devices 12, 14, 16, 18, 20 across wireless network 22, such that the wireless devices return data from their resident applications and subsystems. For example, wireless devices 12, 14, 16, 18, 20 may transmit data, such as network access data 28 and associated data 54, to user manager 30 or some other computer device on the network in the form of a data log 52. Data log 52 includes the access data 28, as configured by collection module 26, and also may include other associated data 54. User manager 30 utilizes data log 52 for analyzing and reporting the network access performance of the respective device. User manager 30 and its corresponding components can give a ready view of network access performance data 28 collected from the wireless devices in any form, such as tables, maps, graphics views, plain text, interactive programs or web pages, or any other display or presentation of the data. For example, user manager 30 may present access data 28 and/or network access performance report 36 on a monitor or display device, and/or may transmit, such as via electronic mail, this information to another computer device for further analysis or review. Also, user manager 30 may change an operational parameter and/or configuration of a respective wireless device, and/or of a network component, based on the actual network access data 28 and associated data 54, or based on performance report 36.

Further, user manager 30 or network access performance module 50 may include a data repository 33, such as any type of local or remote memory and/or storage device, for storing data logs 52.

Analysis engine 34 may include hardware, software, firmware, and combinations thereof for analyzing and processing network access data 28. Additionally, in one embodiment, analysis engine 34 may comprise analysis logic 35, including algorithms, decision-making routines, statistical programs, executable instructions, etc., for analyzing and interpreting access data 28 and generating access performance report 36 and/or access performance characteristic 38. Although illustrated as being associated with user manager 30, analysis engine 34 may be located anywhere in communication with wireless network 22, such as on user manager 30, another server connected to the network, or on a respective wireless device 12, 14, 16, 18, 20.

As noted above, analysis engine 34 outputs access performance report 36, which in one embodiment may be details of network access data 28 and associated data 54 that are reviewed manually, such as by a technician or field engineer, for evaluation of data processing operation-related issues associated with a particular wireless device. In this case, the technician or field engineer, instead of or in cooperation with optimization module 42, may generate new network access operational configuration settings 44 for the respective wireless device 12, 14, 16, 18, 20 based on the collected network access performance data. Generally, report 36 may be useful in trouble-shooting device operational network access-related issues and identifying problem areas and/or devices, such as through analysis of data log 52 and the collected access data 28 and associated data 54. As such, performance report 36 includes any form of output that represents analysis of access data 28, as well as any other associated data 54 from data log 52 of one or more respective wireless devices.

Network access performance module 50 may include software, hardware, firmware and generally any executable instructions operable by analysis engine 34. In one embodiment, for example, network access performance module 50 comprises access performance management logic 55, including executable instructions and data, for managing the generation and transmission of collection configuration 25 to wireless device 12, and the receipt, storage and analysis of data log 52. Further, network access performance module 50 and/or management logic 55 may be operable to download the resident version of network access performance module 24 to each wireless device 12, 14, 16, 18, 20. Alternatively, the resident version of access performance module 24 may be loaded onto the respective wireless device during the initial assembly process, or via serial connections during a configuration process. Further, access performance module 50 is executable by user manager 30 to manage the collection of data logs 52 from wireless devices 12, 14, 16, 18, 20. Network access performance module 50 may "pull" the logs 52 based on commands from a user, or the logs may be "pushed" from the respective devices at predetermined times or upon reaching predetermined memory/data storage levels.

Additionally, as mentioned above, optimization module 42 may get network access data 28 directly from either performance report 36 or data log 52 and apply predetermined algorithms or programs to optimize the settings of one or more device- and/or network-related configurations to improve the network access performance, such as power increases with each access probe attempt, maximum number of access probe attempts, etc. Optimization module 42 may include any hardware, software, firmware and/or other set of executable instructions operable to analyze performance data and determine revised network-specific and/or wireless device-specific configuration changes to improve device performance in and of itself or performance on the network. Additionally, optimization module 42 may be operable to initiate further communications with a respective wireless device 12, 14, 16, 18, 20 and/or a network component, such as a base station, to retrieve additional communications-related data associated with the data log 52, in order to perform further analysis and optimization. The optimizations performed by optimization module 42 may also be performed all or in part by a technician manually reviewing the data log 52 or network access performance report 36, and any associated performance-related data.

Wireless network 22 includes any communications network operable, at least in part, for enabling wireless communications between a respective wireless device 12, 14, 16, 18, 20 and any other device connected to wireless network 22. Further, wireless network 22 may include all network components, and all connected devices that form the network. For example, wireless network 22 may include at least one, or any combination, of: a cellular telephone network; a terrestrial telephone network; a satellite telephone network; an infrared network such as an Infrared Data Association ("IrDA")-based network; a short-range wireless network; a Bluetooth® technology network; a ZigBee® protocol network; an ultra wide band ("UWB") protocol network; a home radio frequency ("HomeRF") network; a shared wireless access protocol ("SWAP") network; a wideband network, such as a wireless Ethernet compatibility alliance ("WECA") network, a wireless fidelity alliance ("Wi-Fi Alliance") network, and a 802.11 network; a public switched telephone network; a public heterogeneous communications network, such as the Internet; a private communications network; and land mobile radio network. Suitable examples of telephone networks include at least one, or any combination, of analog and digital networks/technologies, such as: code division multiple access, wideband code division multiple access, universal mobile telecommunications system, advanced mobile phone service, time division multiple access, frequency division multiple access, global system for mobile communication, analog and digital satellite systems, and any other technologies/protocols that may be used in at least one of a wireless communications network and a data communications network.

Network interface 48 may be any mechanism that allows user manager 30 to communicate across wireless network 22. For example, network interface 48 may include a local area network that connects user manager 30 through an Internet Service Provider to the Internet, which in turn may be connected to a respective wireless device through a carrier network and a base station.

Further, system 10 may include a user or operator 49 in communication with user manager 30 and/or wireless devices 12, 14, 16, 18, 20. For example, operator 49 may be a technician, customer service representative, etc. of: a communications carrier responsible for providing service to wireless devices 12, 14, 16, 18, 20; and/or an equipment maker who manufactured the respective wireless device and/or a component within the respective wireless device. Such a user or operator 49 may be interested in network access-related information in order to improve the quality of service of the wireless network and/or the respective wireless device. In any case, user or operator 49 may access user manager 30 via a computer device having a direct or remote, wired or wireless, connection. As such, user or operator 49 may be able to access and manipulate network access performance module 50 as described herein. Further, user or operator 49 may provide inputs to user manager 30 through an input mechanism 51, such as a keyboard, mouse, etc., and may receive outputs from user manager 30, such as report 36 and/or data log 52, through output mechanism 53, such as a display, an audio speaker, a haptic feedback mechanism, etc.

Wireless devices 12, 14, 16, 18, 20 can include any type of computerized, wireless devices, such as cellular telephone 12, personal digital assistant 18, two-way text pager 20, portable computer 14 and even a separate computer platform 16 that has a wireless communication portal, and which also may have a wired connection 56 to a network or the Internet. The wireless device can be a remote-slave, or other device that does not have an end-user thereof but simply communicates data across the wireless network 22, such as remote sensors, diagnostic tools, data relays, and the like. The apparatus and method of access measurement, collecting and reporting on the wireless device can accordingly be performed on any form of wireless device or computer module, including a wired or wireless communication portal, including without limitation, wireless modems, PCMCIA cards, access terminals, personal computers, telephones, or any combination or sub-combination thereof.

Figure 2:
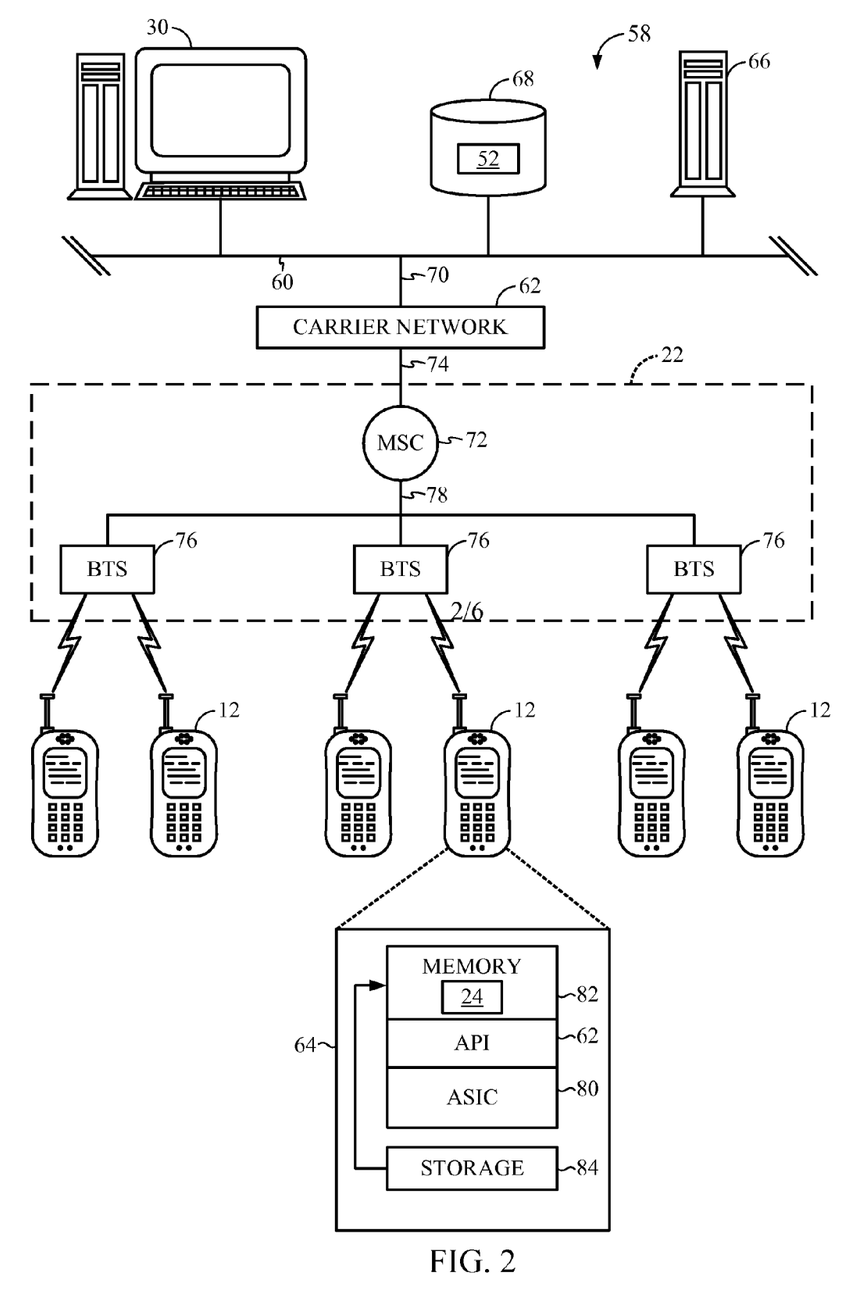
FIG. 2 is a schematic diagram of one embodiment of a cellular telephone network embodiment of the system of FIG. 1, including one embodiment of a computer platform of the wireless device of FIG. 1.

In a cellular telephone embodiment, for example referring to FIG. 2, a cellular telephone system 58 may include wireless network 22 connected to a wired network 60 via a carrier network 62. The use of cellular telecommunication pathways has been increasing because wireless devices, such as the plurality of cellular telephones 12 illustrated in FIG. 2, are being manufactured with increased computing capabilities and are becoming tantamount to personal computers and hand-held personal digital assistants ("PDAs"), communicating packets including voice and data over wireless network 22. These "smart" cellular telephones 12 have installed application programming interfaces ("APIs") 62 onto their local computer platform 64 that allow software developers to create software applications that operate on the cellular telephone, and control certain functionality on the device. FIG. 2 is a representative diagram that more fully illustrates the components of a cellular wireless network and interrelation of the elements of one embodiment of the present system. Cellular wireless network 58 is merely exemplary and can include any system whereby remote modules, such as wireless devices 12, 14, 16, 18, 20, communicate over-the-air between and among each other and/or between and among components of a wireless network 22, including, without limitation, wireless network carriers and/or servers.

In system 58, user manager 30 can be in communication over a LAN network 60 with a separate data repository 68 for storing data logs 52 gathered from the remote wireless devices 12, 14, 16, 18, 20. Further, a data management server 66 may be in communication with user manager 30 to provide post-processing capabilities, data flow control, etc. User manager 30, data repository 68 and data management server 66 may be present on the cellular network 58 with any other network components that are needed to provide cellular telecommunication services. User manager 30, and/or data management server 66 communicate with carrier network 62 through a data link 70, such as the Internet, a secure LAN, WAN, or other network. Carrier network 62 controls messages (generally being data packets) sent to a mobile switching center ("MSC") 72. Further, carrier network 62 communicates with MSC 72 by a network 72, such as the Internet, and/or POTS ("plain old telephone service"). Typically, in network 74, a network or Internet portion transfers data, and the POTS portion transfers voice information. MSC 72 may be connected to multiple base stations ("BTS") 76 by another network 78, such as a data network and/or Internet portion for data transfer and a POTS portion for voice information. BTS 76 ultimately broadcasts messages wirelessly to the wireless devices, such as cellular telephones 12, by short messaging service ("SMS"), or other over-the-air methods.

Figure 3:
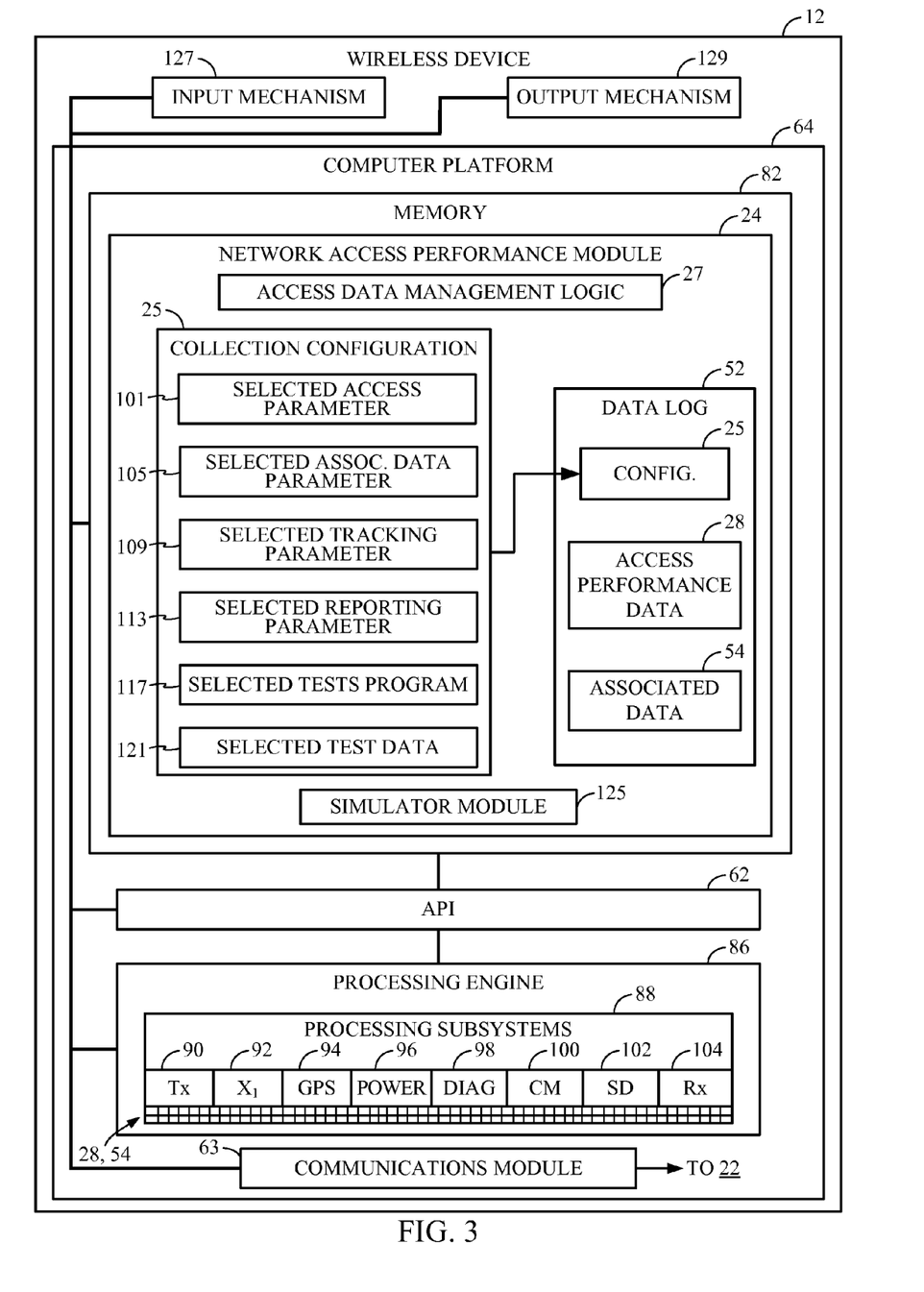
FIG. 3 is one embodiment of an architecture diagram of a wireless device, including a network access performance module and a processing engine of the wireless device of FIG. 1.

Referring to FIGS. 2 and 3, each wireless device, such as cellular telephone 12 in this case, has computer platform 64 that can transmit data across wireless network 22, and that can receive and execute software applications and display data transmitted from user manager 30 or another computer device connected to wireless network 22. Computer platform 64 also includes an application-specific integrated circuit ("ASIC") 80, or other chipset, processor, logic circuit, or other data processing device. ASIC 80 or other processor may execute an application programming interface ("API") layer 62 that interfaces with any resident programs, such as access performance module 24, in a memory 82 of the wireless device. API 62 is a runtime environment executing on the respective wireless device. One such runtime environment is Binary Runtime Environment for Wireless® (BREW®) software developed by Qualcomm, Inc., of San Diego, Calif. Other runtime environments may be utilized that, for example, operate to control the execution of applications on wireless computing devices. Memory 82 may include read-only and/or random-access memory (RAM and ROM), EPROM, EEPROM, flash cards, or any memory common to computer platforms. Computer platform 64 also includes a data storage 84 that can hold the software applications, files, or data not actively used in memory 82, such as the software applications or data downloaded from user manager 30. Storage 84 may include one or more flash memory cells and any secondary or tertiary storage device, such as magnetic media, EPROM, EEPROM, optical media, tape, or soft or hard disk. Additionally, storage 84 can ultimately hold a resident copy of access performance module 24 or agent, as is further described herein.

Referring specifically to FIG. 3, in one embodiment, each wireless device, such as cellular telephone 12, further includes a communications module 63 that enables communications among the various components of each wireless device, and between each wireless device and wireless network 22. Communications module 63 may be implemented in any combination of hardware, software, firmware, etc.

Processing engine 86 includes various processing subsystems 88 embodied in hardware, firmware, software, and combinations thereof, that enable the functionality of the respective wireless device 12,14,1618,20 and the operability of the respective device on wireless network 22, such as for connecting with the network, exchanging data/communications with other devices, etc. For example, processing engine 86 may include, one or a combination of processing subsystems 88, such as: sound, non-volatile memory, file system, transmit, receive, searcher, physical layer, link layer, call processing layer, main control, remote procedure, music, audio, handset, power management, diagnostic, digital signal processor, vocoder, messaging, call manager, Bluetooth®, Bluetooth® LPOS, position determination, position engine, user interface, sleep, data services, security, authentication, USIM/SIM, voice services, graphics, USB, video services, camera/camcorder interface and associated display drivers, multimedia such as MPEG, GPRS, etc., along with other functionality applications. It should be noted that preceding list is only one example, and that the subsystems may include any service or functionality operable on a wireless device. Further, in one embodiment, API 62 includes a class of software extensions that allow network access performance module 24 to access processing engine 86. These software extensions can communicate with processing subsystems 88 on the wireless device, which allows both data reads and commands. For example, this software extension can send commands, including register for log messages, on behalf of the applications that invoke it. The module can then forward the responses of the subsystems to network access performance module 24, or ultimately across wireless network 22 to user manager 30. Each resident application on wireless device can create an instance of this new software extension to communicate with the subsystems independently.

Further, for example, in one embodiment, such as cellular telephone 12, processing subsystems 88 may include a receive ("Rx") component 104 for receiving communications sent to the processor of the wireless device, system determination ("SD") component 102 for handling the initiation, authentication, handoffs, data exchanges, messaging protocols, internal processing and decision-making, etc. associated with processing a message, and a transmit ("Tx") component 90 for sending communications from the processor of the wireless device, such as to handset components, wireless network 22, wireless network components, and other devices connected to the wireless network. In this embodiment, SD component 102 may handle tasks relating to selecting an appropriate system, from a plurality of systems, with which to communicate. In addition, processing subsystems 86 may include at least one of a position/location or Global Positioning System ("GPS") component 94 for determining the geographical location of the device, a power management component ("Power") 96 for controlling the changes to the device power levels on each network access attempt, a diagnostic component 98 for evaluating a subsystem and troubleshooting, a call manager ("CM") component 100 for characterizing and logging call types, and other non-enumerated subsystems 92, "X1," e.g., call processing, fax, multimedia, messaging (texting) components.

Resident network access performance module 24 may be initiated at any time, and network access data 28 and associated data 54 may be stored on the respective wireless device 12, 14, 16, 18, 20 and obtained at any time via a wired or wireless connection to the respective wireless device. Network access performance module 24 may include any hardware, software, firmware and/or other set of executable instructions operable to manage the collection on the wireless device, and transmission across the wireless network, of any information relating to the network access capabilities of the respective wireless device. Network access performance module 24 collects network access data 28, along with associated data 54 based on configuration 25. Further, network access performance module 24 may store this information in data log 52, either in a resident memory or another data repository connectable to the respective wireless device. Additionally, access performance module 24 may also store the corresponding configuration 25 within log 25 so that an association may be made with the collected data. In one embodiment, for example, network access performance module 24 comprises access data management logic 27, which includes executable instructions and data, to manage the receipt and execution of collection configuration 25, the storage of the gathered access performance data 28 and/or associated data 54, and the access to and/or forwarding of data log 52. Thus, in one embodiment, access performance module 24 provides each wireless device 12, 14, 16, 18, 20 with a resident or self-contained capability for retrieving and recording actual network access data 28, and/or associated data 54, corresponding with network accessing activities on the wireless device, as well as allowing for the transmission and remote analysis of such network access performance data.

Network access performance module 24 may cause the respective wireless device to selectively transmit data log 52, based on configuration 25, to another computer device, such as user manager 30, on the wireless network. In one embodiment, network access performance module 24 transmits data log 52 from that wireless device 12, 14, 16, 18, 20 to user manager 30 across the wireless network 22 when requested. In other embodiments, network access performance module 24 transmits data log 52 when the available memory hits a predetermined amount, on a time-based, periodic schedule, whenever a communication channel is established, when triggered by a predetermined event, such as an access failure, etc. Further, data log 52 may be transmitted over an open communication connection from the wireless device 12, 14, 16, 18, 20 to the wireless network 22, and thus "piggybacked" across an open connection, such as a voice or data call at the cellular telephone 12. In a cellular network configuration, network data log 52 can be transmitted to user manager 30 through short message service. In another embodiment, remote user manager 30 reads data log 52 from the respective device through the resident network access module 24, and in some instances, writes commands to computer platform 64 and alters the operation of the wireless device 12, 14, 16, 18, 20. Accordingly, the accessibility to network access module 24 allows the user manager 30 to remotely control parameters for data collection, and to analyze and report specific device network access information.

As noted above, access data collection configuration 25 includes parameters that define conditions and types of information to collect as network access data 28 and associated data 54, including when to collect the access data 28, and when to transmit the collected access data 28 across wireless network 22 to user manager 30 and/or another computer device. As mentioned above, in one embodiment, network access data collection configuration 25 is generated by network access performance module 50, and in particular, collection module 26, on user manager 30. It should be noted, however, that network access data collection configuration 25 may be generated by any computer device connected to wireless network 22, or may be locally transmitted to the respective wireless device 12, 14, 16, 18, 20, such as by a manual input from a user, and/or through transmission from a locally-connected device.

For example, in one embodiment, collection configuration 25 includes a selected access parameter 101 chosen from a plurality of access parameters 103 (FIG. 1). Selected access parameter 101 defines which data to collect as access performance data 28, for example, based on a desired network access performance characteristic 38 to be measured. Further, collection configuration 25 may include a selected associated data parameter 105 chosen from a plurality of associated data parameters 107 (FIG. 1). Selected associated data parameter 105 defines which data to collect as associated data 54, which may vary, for example, depending on the selected access parameter 101 as different states or functions occurring on the respective wireless device may be more or less relevant to a given access parameter. Additionally, collection configuration 25 may include a selected tracking parameter 109 chosen from a plurality of tracking parameters 111 (FIG. 1). Selected tracking parameter 109 defines when to collect selected access data 28 and selected associated data 54, which may vary, for example, depending on the given wireless device, the selected parameters 101 and 105, and/or the given scenario. Further, collection configuration 25 may include a selected reporting parameter 113 chosen from a plurality of reporting parameters 115 (FIG. 1). Selected reporting parameter 113 defines when to transmit data log 52 to user manager 30 or some other device. Selected reporting parameter 113 may vary in a manner similar to selected tracking parameter 109.

Additionally, configuration 25 may also include a selected test program 117 and/or selected test data 121 to be processed by the respective wireless device to generate network access data 28 and/or associated data 54. In one embodiment, selected test program 117 is chosen from a plurality of test programs 119 (FIG. 1), while selected test data 121 is chosen from a plurality of test data 123 (FIG. 1). Test program 117 and/or test data 121 may be executed by a simulator module 125 to create or simulate a predetermined network access environment and/or a predetermined wireless device state or condition. Simulator module 125 may be any combination of hardware, software, firmware, instructions and data operable to simulate conditions and/or communications on the respective wireless device. The execution of test program 117 and/or test data 121 thereby enables simulator module 125 to generate a predetermined access scenario to be processed by the respective device in order to test or characterize the network access performance. As such, test programs 117 and/or test data 121 allow for repetition of a consistent network access environment across a plurality of test instances or across a plurality of wireless device.

Additionally, each wireless device, such a cellular phone 12, may further include an input mechanism 127 for receiving information to be processed by the device, and an output mechanism 129 for imparting information received or processed by the device. For example, input mechanism 127 may include a key or keypad, an audio receiver, a touch-sensitive display, a voice recognition program, a mouse, etc. Output mechanism 129 may include, for example, a display, an audio speaker, a haptic mechanism, etc.

Figure 4:
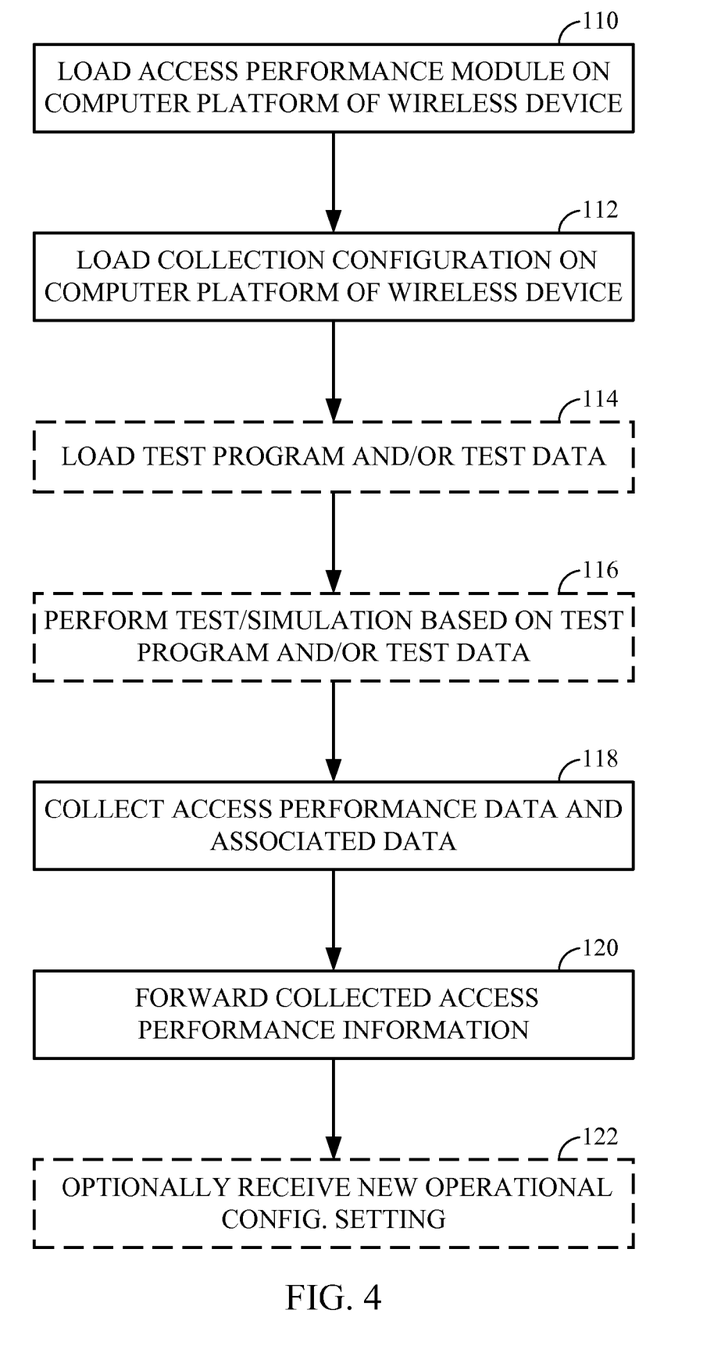
FIG. 4 is a flowchart of one embodiment of a method on a wireless device for determining network access performance.

In operation, referring to FIG. 4, one embodiment of a method for network access performance measurement on a wireless device includes loading at least a portion of a network access performance application onto a computer platform of the wireless device (Block 110). For example, the network access performance application may be embodied within the hardware and/or firmware of the wireless device during the manufacture of the device. Alternatively, the network access performance application may be "pushed" by a user manager to the wireless device, or "pulled" from a user manager by the wireless device, across a wireless network. In another alternative, the loading of the network access performance application may be configurable in any manner, for example, being initiated by a predetermined event, such as unacceptable network access characteristic.

Further, this embodiment of the method includes receiving access data collection configuration, from a remote computer platform, such as a user manager, or pre-loaded prior to the wireless device being placed into service operation respective wireless device in accordance with a predetermined data collection configuration (Block 112).

In an optional embodiment, the method further includes loading a test program and/or test data (Block 114), which may be included in the received data collection configuration, and performing a test or simulation based on the test program and/or test data (Block 116).

This embodiment of the method also includes logging network access performance data on the wireless device or in a memory associated with the wireless device, in accordance with the received access data collection configuration (Block 118). For example, access data 28 and predetermined associated data 54 that are generated by network access attempts and/or communications processing engine of the wireless device during its operation may be stored in data log 52.

Additionally, the method includes forwarding the collected network access performance information for analysis (Block 120). For example, the predetermined network access data may be obtained from the communications processing engine and stored in data log 52 in memory 82 of the wireless device for analysis on the computer platform of the device, or for transmitting across the wireless network for analysis by another computer device, such as user manager 30. Further, in one embodiment, the collected network access performance data is uploaded from the wireless device in accordance with the configuration application, such as through a standard HTTP, an FTP or some other data transfer protocol.

Additionally, this embodiment of the method optionally may include the wireless device receiving new or modified operational configuration parameters, which may be based on the access data 28, and/or the associated data 54 (Block 122). For example, these new or modified operational configuration parameters may be generated by optimization module 42 of user manager 30 located across the wireless network from the wireless device. These new operational configuration parameters may allow the wireless device to improve its network accessing capability.

Figure 5:
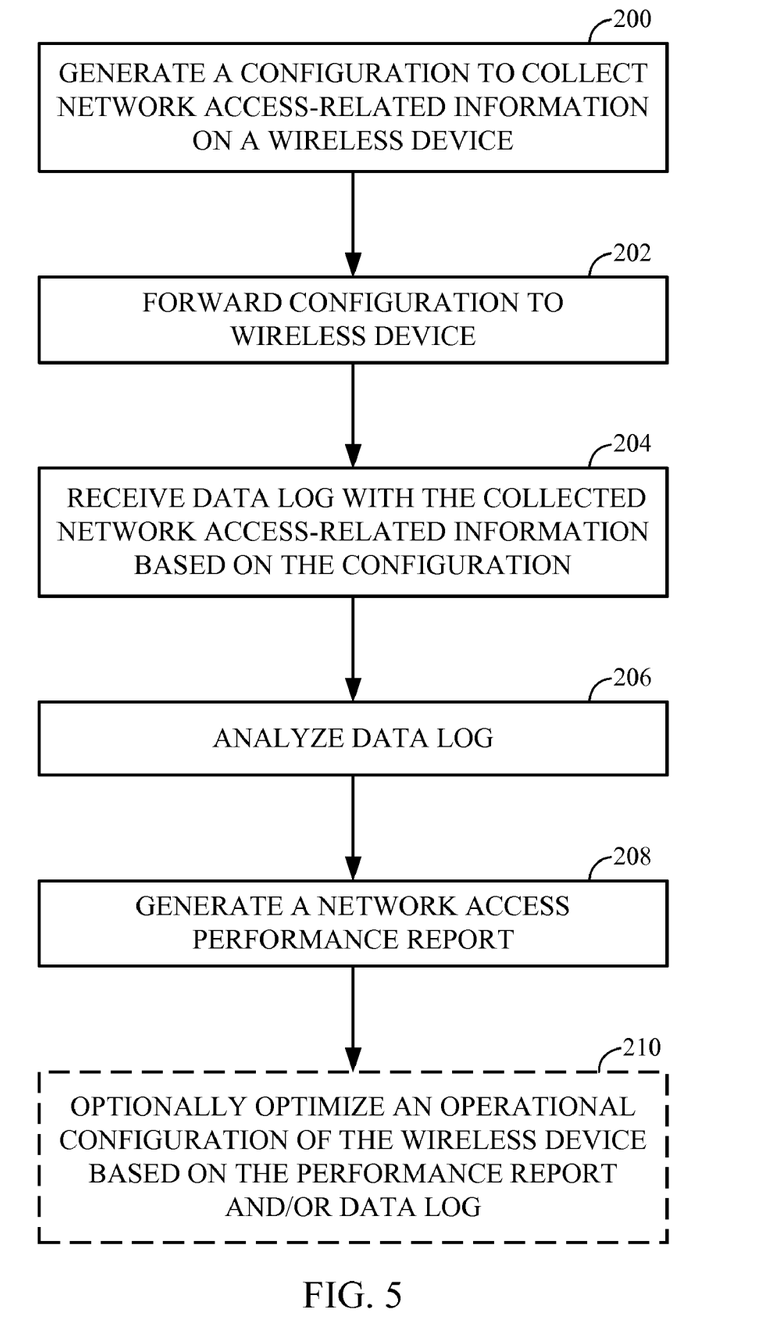
FIG. 5 is a flowchart of one embodiment of a method on an apparatus in communication with a wireless device for determining network access performance.

In operation, referring to FIG. 5, one embodiment of a method for network access performance measurement of a wireless device includes generating a network access collection configuration (Block 200). For example, network access information is collected in accordance with the collection configuration which determines what data is to be collected and when the same is to be collected, along when it will be transmitted from the respective wireless device, for example, for analysis.

Further, this embodiment of the method includes forwarding or transmitting the generated collection configuration to the respective wireless device (Block 202). For example, configuration 25 may be sent from user manager 30, across wireless network 22, to a respective wireless device.

Further, this embodiment of the method includes receiving network access performance information from the respective wireless device in accordance with the access data collection configuration (Block 204). In one embodiment, for example, the collected network access performance information is uploaded from the wireless device in accordance with the configuration application, such as through a standard HTTP, an FTP or some other data transfer protocol.

Further, this embodiment of the method includes analyzing the collected network access information (Block 206), and generating a performance report characterizing the network access performance of the respective wireless device based on the analyzed access information (Block 208). For example, the network access data may be analyzed by an analysis engine associated with a user manager located across the wireless network from the wireless device. Alternatively, the analysis engine may reside on the wireless device. In one embodiment, the analysis engine may compare selected portions of the access performance information with predetermined access performance standards to determine device network access performance. Additionally, the analysis may be based on more than one set of access data. Further, the network access performance may be based on an analysis of a plurality of device subsystem operations. Additionally, generation of the access performance report or characterization includes presenting the results in a table, a graph, etc.

Additionally, the method optionally may include optimizing a configuration of a wireless device and/or a network component based on the performance report (Block 210). For example, this action includes analysis engine executing optimization module to run predetermined algorithms or programs to optimize the settings of one or more device- and/or network-related configurations to improve network accessing capability. In another example of this step, the method may include a technician or analyst reviewing the results and manually making the configuration adjustments. Additionally, it should be noted that the method may be implemented in different locations within the system, in different devices, and by centralized or decentralized processing mechanisms.

Additionally, it should be noted that the method may include granting access to the network access performance data and/or performance report to other business or commercial systems. To ensure the security and/or integrity of the collected network access performance data, such access may be granted in a monitored fashion such as through a user manager. Further, other computer devices, including both storage and processing devices, can be located across the wireless network from the wireless device, and accordingly, the architecture associated with the user manager is readily scalable.

Figure 6:
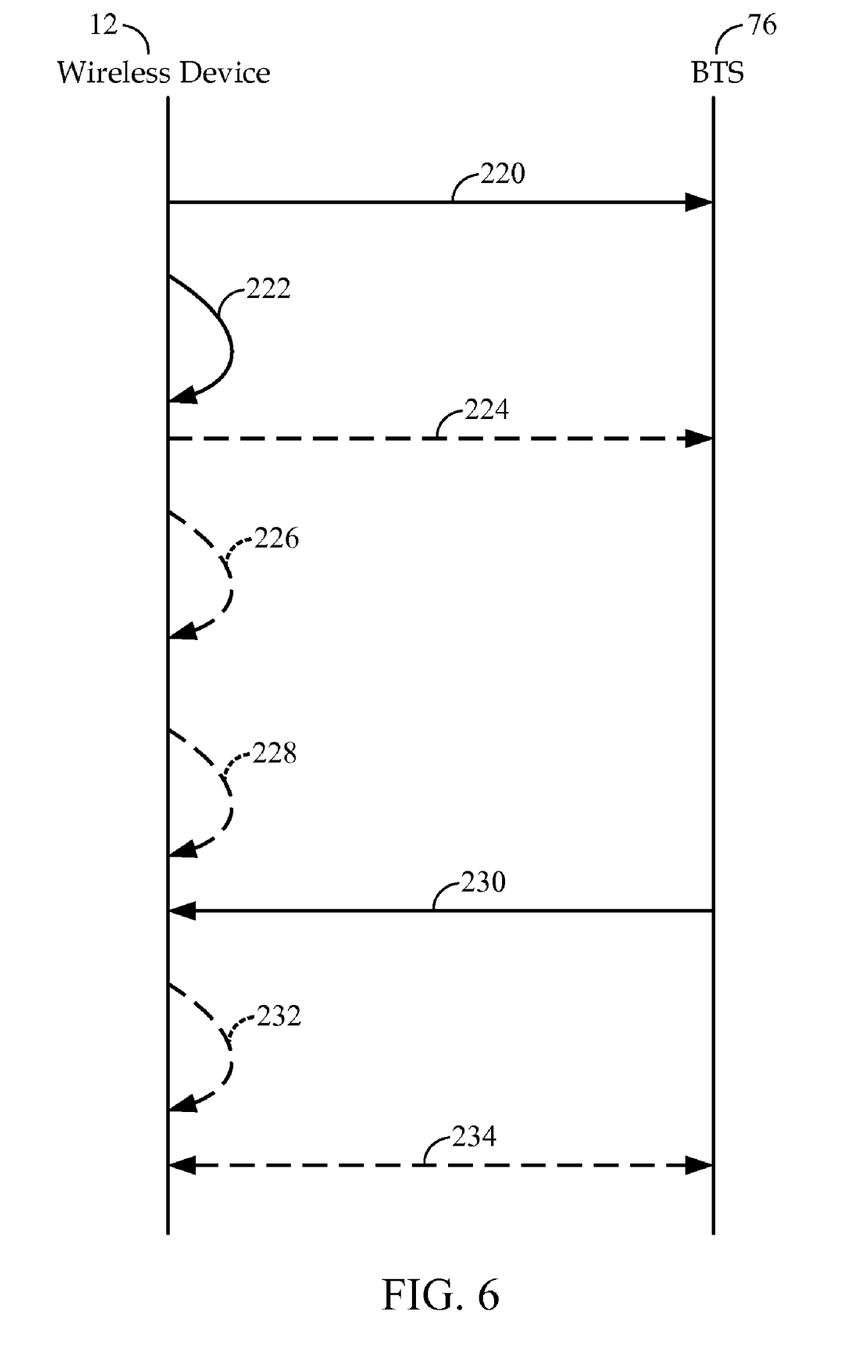
FIG. 6 is a flowchart of the message sequence involving network access success and/or access failure associated with a network access performance of a wireless device.

FIG. 6 is one example of a message sequence involving network access success and/or access failure for a wireless device. Wireless device 12 sends an access request message 220, such as an origination message or a registration message, to a base station 76 to request access to a communications channel. Upon sending access request message 220, device 12 performs a monitoring operation 222 whereby the device sets a timer to wait a predetermined time period for a response from base station 76, and/or further where device 12 sets a counter to count the number of access requests sent. If a response from base station 76 is not received upon expiration of the predetermined time period, and if the counter has not reached a predetermined maximum, then device 12 may send another access request message 224. Again, in the case of a repeated request, device 12 performs a monitoring operation 226 whereby the timer is started and/or the counter is increased by one. In the case where device 12 detects that the predetermined time period has expired and/or that the predetermined maximum number of access requests have been sent without receiving a response from base station 76, then the device may execute termination activities 228 whereby the device discontinues sending the access requests. This condition corresponds to an access failure event, and termination activities 228 may further include notifying the user of the device of such a failure, such as by displaying a message such as "Network Connection Not Available" on the display of the wireless device. Alternatively, device 12 may receive a response message 230, such as a channel assignment message or an acknowledgement message, from base station 76. In the case of a registration request, for example, receiving an acknowledgement is considered an "access success." In the case of an origination request, device 12 proceeds with any follow-up paging/acknowledgement message exchange operations 232 as may be dictated by the given protocol, and a communication channel 234 is established. In the case of the origination request, for example, establishing communication channel 234 is considered an "access success." Such access successes are considered events that may be recorded in data log 52 by the resident network access module 24 if so dictated by monitoring configuration 25.

Another example of access performance-related message exchanges, i.e. access successes and access failures, which may be monitored via the described embodiments is described in U.S. patent application Ser. No. 11/078,235, entitled "APPARATUS AND METHODS FOR DETERMINING CONNECTION QUALITY OF A WIRELESS DEVICE ON A WIRELESS COMMUNICATIONS NETWORK," filed Mar. 11, 2005, assigned to the present assignee and hereby incorporated by reference.

In another example of the above-defined method, an end user complains that he/she is not able to obtain access to the network on their wireless device. A help desk associated with the wireless device and/or the wireless network issues a command from the user manager to download the network access performance module to the wireless device. The help desk configures network access module to collect specific access data, and other associated data, and configures the upload parameters. The end user uses his/her wireless device in a normal fashion, such as by making normal voice calls and data calls. The network access module collects the predetermined access data, and associated data, and uploads this information to the user manager as specified in the upload parameters. The user manager processes/analyzes the network access performance data and generates the performance report, which details and characterizes the network access activities associated with the wireless device. In one embodiment, for example, the analysis by the user manager may conclude that an operational parameter for a given base station is incorrect and are the cause of an access failure. The user manager then notifies the help desk of the report, and the help desk personnel can then make base station operational configuration changes based on the results of the report.

In another example of the above-defined method, a field engineer issues a command from the user manager to download the network access module to a set of wireless devices. The field engineer configures network access module to collect specific network access performance data and associated data, as well as configuring the devices to run specific scripts/tests. In one embodiment, the set of wireless devices are then subjected to a drive test, which due to the recording capabilities of the network access performance module can be implemented without external test and/or measurement devices. It should be noted that the field engineer does not need to physically be inside the drive test vehicle to monitor the testing, as the monitoring can occur from the user manager. In another embodiment, the plurality of wireless devices are used independently, such as in normal operation by their user. The network access module then performs the tests automatically based on the predetermined configuration, and uploads the collected network access performance data to the user manager. The user manager processes/analyzes the network access data and generates a performance report. The user manager notifies the field engineer of the performance report, and the field engineer can then make device operational configuration changes based on the results of the report.

In view of the method being executable on computer platform 64 of a wireless device 12, 14, 16, 18, 20, the method may be implemented via a carrier wave, and/or the method may include a program resident in a computer readable medium. The carrier wave and/or computer readable medium directs a wireless device 12, 14, 16, 18, 20 having a device platform 64 to perform the steps of the method. Such a program can be executed on any single computer platform, or can be executed in a distributed way among several computer platforms. Furthermore, the method can be implemented by a program that directs a computer device such as user manager 30 to perform a network access performance determination through gathering and processing network access data 28 from the wireless devices 12, 14, 16, 18, 20.

The computer readable medium can be the memory 82 of the computer platform 64 of the cellular telephone 12, or other wireless device 17,18,20,22, or can be in a local database, such as local database 84 of the device platform 64. Further, the computer readable medium can be in a secondary storage media that is loadable onto a wireless device computer platform, such as a magnetic disk or tape, optical disk, hard disk, flash memory, or other storage media as is known in the art.

Further, the method may be implemented, for example, by operating portion(s) of the wireless network 22 and/or LAN 60, such as device platform 64 and user manager 30, to execute a sequence of machine-readable instructions. The instructions can reside in various types of signal-bearing or data storage primary, secondary, or tertiary media. The media may comprise, for example, RAM (not shown) accessible by, or residing within, the components of the wireless network 22 or LAN 60. Whether contained in RAM, a diskette, or other secondary storage media, the instructions may be stored on a variety of machine-readable data storage media, such as DASD ("direct access storage device") storage (e.g., a conventional "hard drive" or a RAID ("redundant array of independent disks") array), magnetic tape, electronic read-only memory (e.g., ROM, EPROM, or EEPROM), flash memory cards, an optical storage device (e.g. CD-ROM, WORM (write once, read many), DVD, digital optical tape), paper "punch" cards, or other suitable data storage media including digital and analog transmission media.

In summary, the apparatus can be implemented solely on any wireless device 12, 14, 16, 18, 20. The wireless device can have at least one network access module 24, including an application or agent resident (either permanent or temporarily) on the computer platform 64 thereof which causes the gathering of network access data 28 and associated data 54 from processing engine 86, and which can effect selective transmission of the access performance data for that wireless device to another computer device (such as user manager 30) on the wireless network 22. If the wireless device 12, 14, 16, 18, 20 is so embodied, network access data 28 and associated data 54 may be transmitted over an open communication connection from the wireless device 12, 14, 16, 18, 20 to the wireless network 22, such as an open voice or data call. If the wireless device is a cellular telephone 12 and the wireless network is a cellular telecommunication network, such as shown in FIG. 2, data log 52 can be transmitted through short message service or other wireless communication methods.

User manager 30 then applies analysis engine 32 to the collected access data 28 and/or associated data 54, and generates performance report 36 that details a network access characteristic 38 of the respective wireless device. Based on this report 36, or by implementation of optimization module 42, operational settings of the respective wireless device and/or of the wireless network may be modified to enhance network accessing capabilities.

While the foregoing disclosure shows illustrative embodiments, it should be noted that various changes and modifications could be made herein without departing from the scope of the described embodiments as defined by the appended claims. Furthermore, although elements of the described embodiments may be described or claimed in the singular, the plural is contemplated unless limitation to the singular is explicitly stated.

What is claimed is:

1. An apparatus for determining a network access performance of a wireless device, comprising:
   a network access performance module having a collection module operable to generate and transmit an access data collection configuration to a wireless device having a communication module and a simulator module, the access data collection configuration comprising a network access-related parameter and test data, wherein the test data is executable by the simulator module on the wireless device to simulate an access scenario, wherein the network access-related parameter defines network access data to retrieve from a computer platform integrated within the wireless device, wherein the network access data corresponds to a network access characteristic of the wireless device during the access scenario; and
   a data repository operable to receive and store the network access data, generated by execution of the test data on the wireless device, collected from the computer platform of the wireless device.

2. The apparatus of claim 1, wherein the collection module is further operable to generate and transmit a network access-related test that is executable by the computer platform of the wireless device to generate the network access data to retrieve.

3. The apparatus of claim 1, wherein the access data collection configuration further comprises a tracking parameter and a reporting parameter each associated with the defined types of network access data, the tracking parameter defining when to collect the network access data and the reporting parameter defining when to transmit the collected network access data from the wireless device.

4. The apparatus of claim 1, wherein the network access data comprises at least one of call access-related data, Internet access-related data, text messaging access-related data, or video conferencing access-related data.

5. The apparatus of claim 1, wherein the network access data further comprises associated data including at least one of position/location information, time information, diagnostic information, a state of a device component during a network access attempt by the wireless device, or a statistic or state associated with non-access-related processing occurring on the wireless device during the network access attempt.

6. The apparatus of claim 1, further comprising an analysis engine operable to generate a network access performance report based on the collected network access data, wherein the network access performance report comprises at least the network access characteristic.

7. The apparatus of claim 6, further comprising a an access performance standard, wherein the analysis engine is operable to compare the collected network access data to the access performance standard to generate the network access performance report.

8. The apparatus of claim 1, wherein the network access performance module is operable to generate a device configuration setting effective to change an operational parameter of the wireless device, wherein the device configuration setting is based on the collected network access data.

9. The apparatus of claim 8, further comprising an optimization module having an optimization algorithm operable to generate the device configuration setting.

10. The apparatus of claim 1, wherein the collection module further comprises a plurality of network access-related parameters, and wherein the network access-related parameter is selected from the plurality of network access-related parameters based on the network access performance characteristic to be defined.

11. An apparatus for determining network access performance of a wireless device, comprising:
   means for generating and transmitting an access data collection configuration across a wireless network to a wireless device having a communication module and a simulator module, the access data collection configuration comprising a network access-related parameter and test data, wherein the test data is executable by the simulator module on the wireless device to simulate an access scenario, wherein the network access-related parameter defines network access data to retrieve from a computer platform integrated within the wireless device, wherein the network access data corresponds to a network access characteristic of the wireless device during the access scenario; and
   means for receiving and storing the network access data generated by execution of the test data on the wireless device and collected from the computer platform of the wireless device.

12. At least one processor configured to perform the actions of:
   receiving an access data collection configuration identifying test data and at least one of a plurality of network access data to collect from a processing engine integrated within a wireless device, wherein the wireless device has a communication module and a simulator module;
   executing the test data in a simulator module on the wireless device to simulate an access scenario to generate the identified network access data; and
   collecting the identified network access data generated by execution of the test data on the wireless device based on the received access data collection configuration, wherein the identified network access data corresponds to a network access characteristic of the wireless device during the access scenario.

13. The apparatus of claim 11, wherein the access data collection configuration further comprises a tracking parameter and a reporting parameter each associated with the defined types of network access data, the tracking parameter defining when to collect the network access data and the reporting parameter defining when to transmit the collected network access data from the wireless device.

14. The apparatus of claim 11, wherein the network access data comprises at least one of call access-related data, Internet access-related data, text messaging access-related data, or video conferencing access-related data.

15. The apparatus of claim 11, wherein the network access data further comprises associated data including at least one of position/location information, time information, diagnostic information, a state of a device component during a network access attempt by the wireless device, or a statistic or state associated with non-access-related processing occurring on the wireless device during the network access attempt.

16. The apparatus of claim 11, further comprising a means for generating a network access performance report based on the collected network access data, wherein the network access performance report comprises at least the network access characteristic.

17. The apparatus of claim 16, further comprising an access performance standard, wherein the means for generating the network access performance report is further operable to compare the collected network access data to the access performance standard to generate the network access performance report.

18. The apparatus of claim 11, wherein the means for generating and transmitting is further operable to generate a device configuration setting effective to change an operational parameter of the wireless device, wherein the device configuration setting is based on the collected network access data.

19. The apparatus of claim 18, wherein the means for generating and transmitting further comprises a means for optimizing the device configuration setting.

20. The apparatus of claim 11, wherein the means for generating and transmitting further comprises a plurality of network access-related parameters, and wherein the network access-related parameter is selected from the plurality of network access-related parameters based on the network access performance characteristic to be defined.

21. The apparatus of claim 11, wherein the access scenario comprises at least one of a network access environment, a wireless device state, or a wireless network access scenario.

22. The apparatus of claim 11, wherein the network access data comprises at least one of searcher information, finger assignment information, interoperability information, access channel information, dedicated paging channel information, forward traffic channel information, reverse traffic channel information, messaging information, system acquisition information, high speed packet data information, call type information, plain old telephone system information, 3-way calling information, call waiting information, voice mail information, authentication information, provisioning information, over-the-air parameter administration, Internet Protocol over-the-air information, short message service information, multimedia service information, or browser data information.

23. The apparatus of claim 1, wherein the access scenario comprises at least one of a network access environment, a wireless device state, or a wireless network access scenario.

24. The apparatus of claim 1, wherein the network access data comprises at least one of searcher information, finger assignment information, interoperability information, access channel information, dedicated paging channel information, forward traffic channel information, reverse traffic channel information, messaging information, system acquisition information, high speed packet data information, call type information, plain old telephone system information, 3-way calling information, call waiting information, voice mail information, authentication information, provisioning information, over-the-air parameter administration, Internet Protocol over-the-air information, short message service information, multimedia service information, or browser data information.

25. A method of determining a network access performance of a wireless device, comprising:

receiving an access data collection configuration identifying test data at least one of a plurality of network access data to collect from a processing engine integrated within the wireless device, wherein the wireless device has a communication module and a simulator module;

executing the test data in the simulator module on the wireless device to simulate an access scenario to generate the identified network access data; and collecting the identified network access data generated by execution of the test data on the wireless device based on the received access data collection configuration, wherein the identified network access data corresponds to a network access characteristic of the wireless device during the access scenario.

26. The method of claim 25, further comprising executing a test program to generate the identified network access data.

27. The method of claim 25, further comprising receiving a new device operational configuration setting operable to change the access characteristic of the wireless device, wherein the new device operational configuration setting is based on the collected network access data.

28. A computer program product, comprising:
at least one instruction operable to cause a computer to receive an access data collection configuration identifying test data and at least one of a plurality of network access data to collect from a processing engine integrated within a wireless device, wherein the wireless device has a communication module and a simulator module;
at least one instruction operable to cause the computer to execute the test data in the simulator module on the wireless device to simulate an access scenario to generate the identified network access data; and
at least one instruction operable to cause the computer to collect the identified network access data generated by execution of the test data on the wireless device based on the received access data collection configuration, wherein the identified network access data corresponds to a network access characteristic of the wireless device during the access scenario.

29. The method of claim 25, wherein the collected network access data comprises at least one of searcher information, finger assignment information, interoperability information, access channel information, dedicated paging channel information, forward traffic channel information, reverse traffic channel information, messaging information, system acquisition information, high speed packet data information, call type information, plain old telephone system information, 3-way calling information, call waiting information, voice mail information, authentication information, provisioning information, over-the-air parameter administration, Internet Protocol over-the-air information, short message service information, multimedia service information, or browser data information.

30. The method of claim 25, wherein the collected network access data further comprises associated data comprising at least one of position/location information, time information, diagnostic information, a state of a device component during a network access attempt by the wireless device, or a statistic or state associated with non-access-related processing occurring on the wireless device during the network access attempt.

31. The method of claim 25, wherein the access scenario comprises at least one of a network access environment, a wireless device state, or a wireless network access scenario.

32. The method of claim 13, further comprising selectively transmitting the collected network access data across the wireless network.

33. The method of claim 25, wherein the collected network access data comprises at least one of call access-related data, Internet access-related data, text messaging access-related data, or video conferencing access-related data.

34. The method of claim 25, wherein the access data collection configuration further comprises a network access-related parameter, wherein the network access-related parameter comprises one of a plurality of network access-related parameters based on the network access characteristic.

35. A computer program product, comprising:
at least one instruction operable to cause a computer to receive an access data collection configuration identifying test data at least one of a plurality of network access data to collect from a processing engine integrated within a wireless device, wherein the wireless device has a communication module and a simulator module;
at least one instruction operable to cause the computer to execute the test data in the simulator module on the wireless device to simulate an access scenario to generate the identified network access data; and
at least one instruction operable to cause the computer to collect the identified network access data generated by execution of the test data on the wireless device based on the received access data collection configuration, wherein the identified network access data corresponds to a network access characteristic of the wireless device during the access scenario.

36. The computer program product of claim 35, further comprising at least one instruction operable to cause the computer to execute a test program to generate the identified network access data.

37. The computer program product of claim 35, further comprising at least one instruction operable to cause the computer to receive a new device operational configuration setting operable to change the access characteristic of the wireless device, wherein the new device operational configuration setting is based on the collected network access data.

38. The computer program product of claim 35, wherein the access data collection configuration further comprises a tracking parameter selected from a plurality of tracking parameters and a reporting parameter selected from a plurality of reporting parameters, and wherein the at least one instruction operable to cause the computer to collect the identified network access data is based on the tracking parameter, and further comprising at least one instruction operable to cause the computer to selectively transmit the collected network access data based on the reporting parameter.

39. The computer program product of claim 35, wherein the collected network access data comprises at least one of searcher information, finger assignment information, interoperability information, access channel information, dedicated paging channel information, forward traffic channel information, reverse traffic channel information, messaging information, system acquisition information, high speed packet data information, call type information, plain old telephone system information, 3-way calling information, call waiting information, voice mail information, authentication information, provisioning information, over-the-air parameter administration, Internet Protocol over-the-air information, short message service information, multimedia service information, or browser data information.

40. The computer program product of claim 35, wherein the collected network access data further comprises associated data comprising at least one of position/location information, time information, diagnostic information, a state of a device component during a network access attempt by the wireless device, or a statistic or state associated with nonaccess-related processing occurring on the wireless device during the network access attempt.

41. The computer program product of claim 35, wherein the access scenario comprises at least one of a network access environment, a wireless device state, or a wireless network access scenario.

42. The computer program product of claim 35, further comprising at least one instruction operable to cause the computer to selectively transmit the collected network access data across the wireless network.

43. The computer program product of claim 35, wherein the collected network access data comprises at least one of call access-related data, Internet access-related data, text messaging access-related data, or video conferencing access-related data.

44. The computer program product of claim 35, wherein the access data collection configuration further comprises a network access-related parameter, wherein the network access-related parameter comprises one of a plurality of network access-related parameters based on the network access characteristic.

45. At least one processor configured to perform the actions of:
receiving an access data collection configuration identifying test data at least one of a plurality of network access data to collect from a processing engine integrated within a wireless device, wherein the wireless device has a communication module and a simulator module;
executing the test data in a simulator module on the wireless device to simulate an access scenario to generate the identified network access data; and
collecting the identified network access data generated by execution of the test data on the wireless device based on the received access data collection configuration, wherein the identified network access data corresponds to a network access characteristic of the wireless device during the access scenario.

46. The at least one processor of claim 45, further configured to execute a test program to generate the identified network access data.

47. The at least one processor of claim 45, further configured to receive a new device operational configuration setting operable to change the access characteristic of the wireless device, wherein the new device operational configuration setting is based on the collected network access data.

48. The at least one processor of claim 45, wherein the access data collection configuration further comprises a tracking parameter selected from a plurality of tracking parameters and a reporting parameter selected from a plurality of reporting parameters, and wherein the collecting of the identified network access data is based on the tracking parameter, and wherein the at least one processor is further configured to selectively transmit the collected network access data based on the reporting parameter.

49. The at least one processor of claim 45, wherein the collected network access data comprises at least one of searcher information, finger assignment information, interoperability information, access channel information, dedicated paging channel information, forward traffic channel information, reverse traffic channel information, messaging information, system acquisition information, high speed packet data information, call type information, plain old telephone system information, 3-way calling information, call waiting information, voice mail information, authentication information, provisioning information, over-the-air parameter administration, Internet Protocol over-the-air information, short message service information, multimedia service information, or browser data information.

50. The at least one processor of claim 45, wherein the collected network access data further comprises associated data comprising at least one of position/location information, time information, diagnostic information, a state of a device component during a network access attempt by the wireless device, or a statistic or state associated with non-access-related processing occurring on the wireless device during the network access attempt.

51. The at least one processor of claim 45, wherein the access scenario comprises at least one of a network access environment, a wireless device state, or a wireless network access scenario.

52. The at least one processor of claim 45, further configured to selectively transmit the collected network access data across the wireless network.

53. The at least one processor of claim 45, wherein the collected network access data comprises at least one of call access-related data, Internet access-related data, text messaging access-related data, or video conferencing access-related data.

54. The at least one processor of claim 45, wherein the access data collection configuration further comprises a network access-related parameter, wherein the network access-related parameter comprises one of a plurality of network access-related parameters based on the network access characteristic.

55. At least one processor configured to perform the actions of:
generating and transmitting an access data collection configuration across a wireless network to a wireless device having a communication module and a simulator module, the access data collection configuration comprising a network access-related parameter and test data, wherein the test data is executable by a simulator module on the wireless device to simulate an access scenario, wherein the network access-related parameter defines network access data to retrieve from a computer platform integrated within the wireless device, wherein the network access data corresponds to a network access characteristic of the wireless device during the access scenario; and
receiving and storing the network access data generated by execution of the test data on the wireless device and collected from the computer platform of the wireless device.

56. The at least one processor of claim 55, wherein the generating and transmitting further comprises generating and transmitting a network access-related test that is executable by the computer platform of the wireless device to generate the network access data to retrieve.

57. The at least one processor of claim 55, wherein the access data collection configuration further comprises a tracking parameter and a reporting parameter each associated with the defined types of network access data, the tracking parameter defining when to collect the network access data and the reporting parameter defining when to transmit the collected network access data from the wireless device.

58. The at least one processor of claim 55, wherein the network access data comprises at least one of call access-related data, Internet access-related data, text messaging access-related data or video conferencing access-related data.

59. The at least one processor of claim 55, wherein the network access data further comprises associated data including at least one of position/location information, time information, diagnostic information, a state of a device component during a network access attempt by the wireless device, or a statistic or state associated with non-access-related processing occurring on the wireless device during the network access attempt.

60. The at least one processor of claim 55, further configured to perform the action of generating a network access performance report based on the collected network access data, wherein the network access performance report comprises at least the network access characteristic.

61. The at least one processor of claim 60, further comprising an access performance standard, wherein the generating of the network access performance report further comprises comparing the collected network access data to the access performance standard to generate the network access performance report.

62. The at least one processor of claim 55, wherein the generating and transmitting further comprises generating a device configuration setting effective to change an operational parameter of the wireless device, wherein the device configuration setting is based on the collected network access data.

63. The at least one processor of claim 62, wherein the generating and transmitting further comprises optimizing the device configuration setting based on an optimization algorithm.

64. The at least one processor of claim 55, further comprises a plurality of network access-related parameters, and further comprising selecting the network access-related parameter from the plurality of network access-related parameters based on the network access performance characteristic to be defined.

65. The at least one processor of claim 55, wherein the access scenario comprises at least one of a network access environment, a wireless device state, or a wireless network access scenario.

66. The at least one processor of claim 55, wherein the network access data comprises at least one of searcher information, finger assignment information, interoperability information, access channel information, dedicated paging channel information, forward traffic channel information, reverse traffic channel information, messaging information, system acquisition information, high speed packet data information, call type information, plain old telephone system information, 3-way calling information, call waiting information, voice mail information, authentication information, provisioning information, over-the-air parameter administration, Internet Protocol over-the-air information, short message service information, multimedia service information, or browser data information.

* * * * *